US00RE36244E

United States Patent [19]

Matthews

[11] E Patent Number: Re. 36,244

[45] Reissued Date of Patent: Jul. 6, 1999

[54] WELL PLUGGING APPARATUS AND METHOD

[76] Inventor: Bruce Matthews, Rte. 2, Box 681, Harpers Ferry, W. Va. 25425

[21] Appl. No.: 08/723,355

[22] Filed: Sep. 30, 1996

Related U.S. Patent Documents

Reissue of:

[64] Patent No.: 5,435,388
Issued: Jul. 25, 1995
Appl. No.: 08/291,463
Filed: Aug. 17, 1994

U.S. Applications:

[62] Division of application No. 08/051,854, Apr. 26, 1993, Pat. No. 5,361,840.

[51] Int. Cl.[6] ..... E21B 23/00; E21B 34/00

[52] U.S. Cl. ..... 166/250; 166/332.3; 251/294

[58] Field of Search ..... 166/250, 255, 166/153, 154, 155, 156, 192, 193, 194, 195, 196, 202, 203, 332.3; 251/294

[56] References Cited

U.S. PATENT DOCUMENTS

| | | | |
|---|---|---|---|
| 4,007,783 | 2/1977 | Amancharla et al. | 166/135 |
| 4,129,184 | 12/1978 | Parker | 166/315 |
| 4,299,281 | 11/1981 | Long et al. | 166/135 |
| 4,603,742 | 8/1986 | Wong et al. | 166/374 |
| 4,718,408 | 1/1988 | Pringle et al. | 166/192 |
| 4,875,615 | 10/1989 | Savard | 166/135 |
| 5,044,437 | 9/1991 | Wittrisch | 166/250 |
| 5,095,983 | 3/1992 | Magnani | 166/250 |
| 5,121,797 | 6/1992 | DeCuir, Sr. | 166/386 |
| 5,158,138 | 10/1992 | DeCuir, Sr. | 166/90 |
| 5,217,072 | 6/1993 | Wittrisch | 166/250 |
| 5,263,684 | 11/1993 | McGuire | 251/294 |

*Primary Examiner*—William Neuder
*Attorney, Agent, or Firm*—Nixon & Vanderhye, P.C.

[57] ABSTRACT

An apparatus for plugging a burning or gushing well comprises a hollow tubular plug body (20) sized for insertion into a well casing (112). Provided on the plug body are a retainer module (54) for retaining the plug within the well casing; a sealing sleeve (46) provided for forming a seal between the plug body and the well casing; and a valve assembly (50) for selectively closing a hollow internal passageway of the tubular plug body. The plug body is loaded on a gantry assembly (21), which in turn is carried by a shielded vehicle (24). At the base of the gantry assembly are provided an alignment assembly (37) for aid in approach to the well casing and a cutter assembly (40) for sawing off inordinately protruding casings. In one embodiment, a protective break-away shell (118) circumferentially surrounds at least a portion of the plug body.

11 Claims, 12 Drawing Sheets

WELL PLUGGING APPARATUS AND METHOD

Matter enclosed in heavy brackets [ ] appears in the original patent but forms no part of this reissue specification; matter printed in italics indicates the additions made by reissue.

This is a divisional of application Ser. No. 08/051,854, filed Apr. 26, 1993, [and U.S. Pat. No. 5,367,840] *now U.S. Pat. No. 5,361,840.*

BACKGROUND

1. Field of Invention

This invention pertains to the method apparatus and system for extinguishing and capping burning or gushing oil, gas, geothermal, or water wells.

2. Related Art and Other Considerations

Few things on earth are as awesome and dangerous as oil or gas well fires. The extremes of temperature, pressure, noxious/toxic fumes, acidic impurities in crude oil, slippery conditions, limited visibility, and difficult site conditions combine to make extinguishing and capping a burning or gushing well very difficult and hazardous. Many developments such as automatic shut-off valves, safety valves and blowout preventers attempt to eliminate wild wells before they get out of control. These methods certainly reduce the risk of wild wells, but several well fires still occur in an average year throughout the world. They may be caused by static electricity, lightning, human error, higher pressure than anticipated, accidents, sabotage, or other reasons.

The standard methods of oil well fire-fighting and capping were developed in the 1920's or earlier. The most popular and universal extinguishing method consists of driving a crane-like piece of equipment close to the burning well so that it suspends a container of hundred of pounds of high explosives near the apex of the flame. The equipment operator then dismounts his vehicle and immediately vacates the area of the well. The explosive is detonated and (usually) sufficiently deprives the fire of oxygen to extinguish the fire. This leaves a gushing well with a high danger of reignition. Gushing wells are usually capped by several men going to the wellhead and connecting a control valve (e.g., Christmas Tree valve). The valve connection is accomplished mostly by hand with the aid of some tools and equipment, but the men are covered with crude oil and struggle against pressures that may exceed 20,000 psi. If a gushing well reignites from a static spark, heat, or lightning, all personnel in the vicinity who are covered with oil are endangered by a possibility of being instantly incinerated.

As a result of the oil field fires in Kuwait in 1991, several new methods of extinguishing well fires have been used with varying success such as liquid nitrogen injection and blowing out the fire with the exhaust of a jet engine. However, they all place people with only limited protection in close proximity to the fire and all leave a gushing well to be capped. Additionally, they are limited when another burning well is close by. The only method that extinguishes and "CAPS" a well simultaneously consists of dropping a heavy dome over the wellhead. The dome is only a temporary cap that must be removed to place the well into production.

Up until now, no method has been able to extinguish, cap, and place a well into production in a matter of minutes and without exposing people to crude oil, heat, flame, fumes, and slippery conditions.

Accordingly, it is an object of the present invention to provide a method, apparatus, and system for extinguishing and capping burning or gushing wells with maximum safety and minimum exposure of personnel.

An advantage of the present invention is the provision of a method, apparatus, and system that renders a well usable a short time after plugging.

Another advantage of the present invention is the provision of method and apparatus for accomplishing the entire plugging operation by remote control from a distant position of safety, thus not endangering human life.

Yet another advantage of the present invention is the provision of apparatus and method that are operative on damaged well casings above ground, and even on casings that may be broken off below ground level.

Still another advantage of the present invention is the provision of apparatus and method that extinguishes and caps a well in a single process.

A further advantage of the present invention is the provision of apparatus and method which does not require explosives or an inordinate amount of time.

An even further advantage of the present invention is the provision of apparatus and method that extinguishes and caps a well right next to another burning well.

Another advantage of the present invention is the provision of apparatus and method which are more economical than alternative methods and equipment.

Another advantage of the present invention is the provision of apparatus and method which utilize components which are simple and reliable.

SUMMARY

This invention is a remote controlled, protected vehicle with an attached plug insertion apparatus and specially designed hot plug which, when inserted into a well casing, locks itself to the well casings' interior, seals itself to the well casing's interior, and closes its integral valve to shut off fluid flow and extinguish the fire, if any. The entire system can withstand the high heat, flame, pressure, and forces exhibited by uncontrolled wells. It does not endanger human life but does put the well rapidly into production. The system is self-aligning and can cut off a damaged well casing, if necessary.

The apparatus for plugging a burning or gushing well comprises a hollow tubular plug body sized for insertion into a well casing. Provided on the plug body are a retainer module for retaining the plug within the well casing; a sealing sleeve provided for forming a seal between the plug body and the well casing; and a valve for selectively closing a hollow internal passageway of the tubular plug body. The plug body is loaded on a gantry assembly, which in turn is carried by a shielded vehicle. At the base of the gantry assembly are provided an alignment assembly for aid in approach to the well casing and a cutter assembly for sawing off inordinately protruding casings. In one embodiment, a protective break-away shell circumferentially surrounds at least a portion of the plug body.

In accordance with a method of the invention, the plug body is inserted into the well casing and locked in place by actuating the retainer module. A seal is then formed between the peripheral surface of the plug body and the well casing. The hollow internal passageway of the tubular plug body is selectively closed by operation of the valve assembly, thereby extinguishing the fire.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1A:
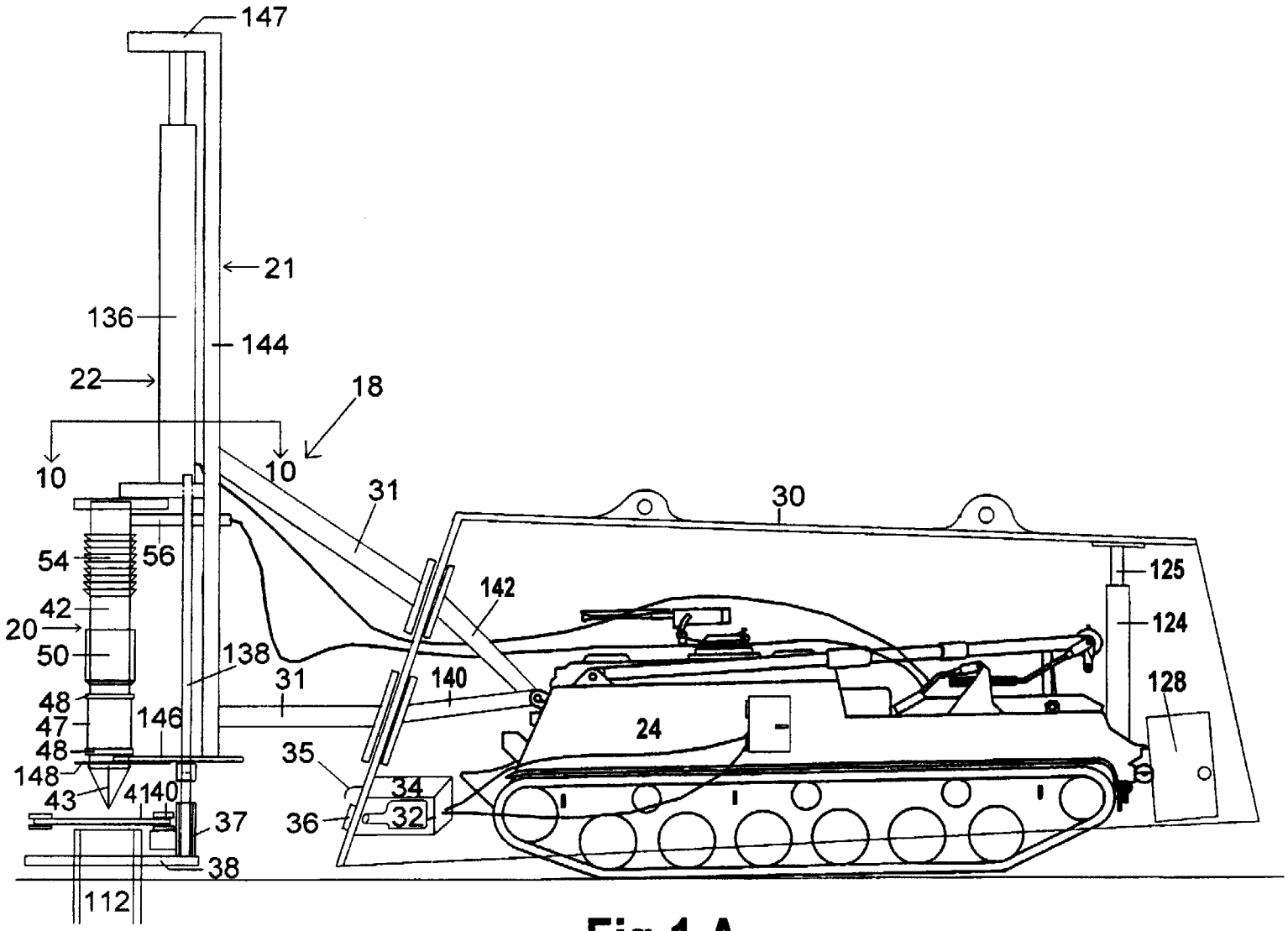
FIG. 1A is a side view of apparatus for plugging a burning or gushing well according to a first embodiment of the invention, the apparatus being carried upon a first type of military vehicle.

FIG. 1A shows an installation apparatus 18 for installing a plug 20 (also known as the "hot plug") in a casing 112 of a burning oil or gas well or gushing water, geothermal, oil or gas well. The structure of the hot plug 20 per se will be described in further detail with reference to FIGS. 2–5.

As shown in FIG. 1A, the installation apparatus consists of gantry assembly 21 which includes an insertion ram 22 (also known as a plug insertion means); a track driven, self-propelled, heat-shielded vehicle 24; a heat shield 30 carried by the vehicle 24; and, a plurality of connecting arms 31 for connecting the gantry assembly 21 to the heat shield 30 and ultimately to the vehicle 24 by struts 140 and 142. The connecting arms 31 comprise steel struts. Although not shown as such, it should be understood that there are left and right lower struts 31 as well as left and right upper struts 31, and left and right struts 140 and 142.

On a front surface thereof, the heat shield 30 bears a video camera 32 within a protective enclosure 34. The enclosure 34 has a transparent pyrex window 36 that is continuously cleaned on its exterior by a pressure jet spray of non-combustible gas such as nitrogen. In this regard, a spray port 35 is provided above the pyrex window 36 and is connected by hoses to a cylinder of compressed gas or a motor driven pump (mounted either in the enclosure 34 or on the vehicle 24) for supplying the non-combustible gas.

At its base, the gantry assembly 21 carries an alignment assembly 37 including an alignment fork 38, as well as a casing cutter 40. The casing cutter includes a cut-off saw 41. The alignment assembly 37 and the casing cutter 40 are described in greater detail hereinafter with reference to FIGS. 6A and 6B.

The heat shield 30 comprises heavy steel plates which form an essentially inverted box-like enclosure having front, back, left side, right side, and top walls. The external surface of the heat shield is provided with a reflective coating such as aluminizing to reduce its heat absorption even further.

The heat shield 30 has supporting members of steel and an access door 128 located on its left side near its rear. The heat shield 30 is mounted on the vehicle 24 by a plurality of struts, including rear support struts 124. Rear support struts 124 include hydraulic cylinders 125 which allow the heat shield 30 to be raised or lowered. There is sufficient structural bracing (not shown on FIG. 1A for sake of clarity) internally in the heat shield 30 to maintain a rigid, box like structure.

The gantry assembly 21 comprises two heavy gantry vertical frame members or tower 144; two gantry guide rods 138 (only one being shown in FIG. 1A, the other being behind the rod shown in FIG. 1A); a very heavy hydraulic cylinder 136; a rigid horizontal gantry base plate 146; a horizontal gantry top plate 147; and, movable plug guides 148. The plates 147 and 146 are attached to (or integral with) the gantry vertical frame members 144. The lower ends of the guide rods 138 extend below the base plate 146 and provide for rigid connection of the alignment assembly 37 and the cutter assembly 40. The alignment assembly 37 and cutter assembly 40 are described in further detail with reference to FIGS. 6A and 6B.

Figure 1B:
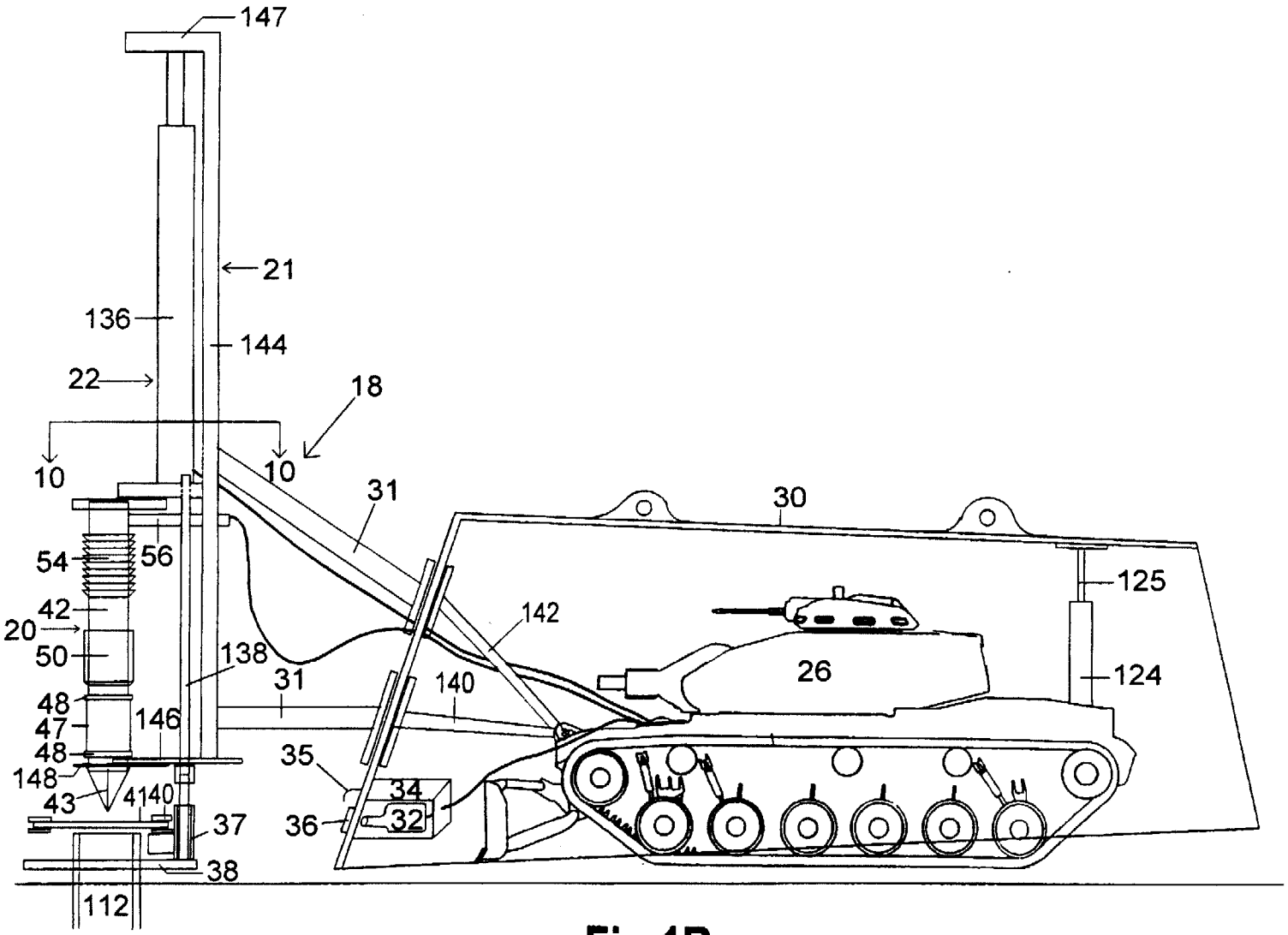
FIG. 1B is a side view of the apparatus of FIG. 1A being carried upon a second type of military vehicle.
Figure 1C:
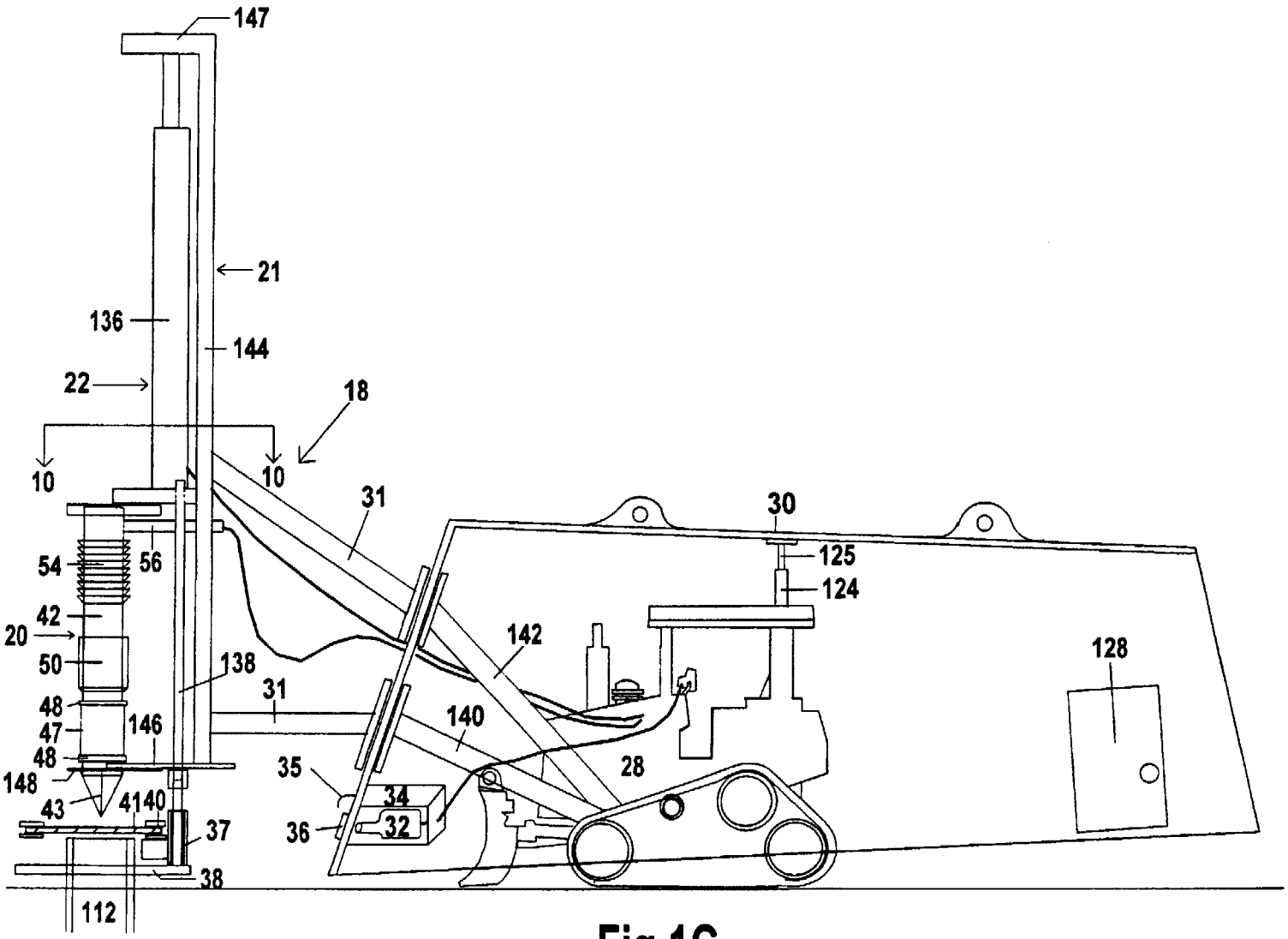
FIG. 1C is a side view of the apparatus of FIG. 1A being carried upon a civilian vehicle such as a bull dozer or front-end loader.

FIGS. 1B and 1C show essentially identical installation apparatuses 18 and plugs 20, and primarily differ in the type of vehicle upon which the heat shield 30 and installation apparatus 18 are mounted. In particular, FIG. 1B shows the installation apparatus 18 and heat shield 30 carried on an alternate type of military vehicle 26 (such as a military tank or self-propelled artillery piece), while FIG. 1C shows the installation apparatus 18 and heat shield 30 carried on a civilian vehicle 28 (such as a bull dozer, front-end loader, or other standard, commonly available, piece of construction equipment of sufficient weight). FIGS. 1B and 1C employ the same reference numerals as FIG. 1A for illustrating identical or comparable structure. Various structural details not shown in FIGS. 1B and 1C are understood with reference to FIG. 1A.

Figure 2:
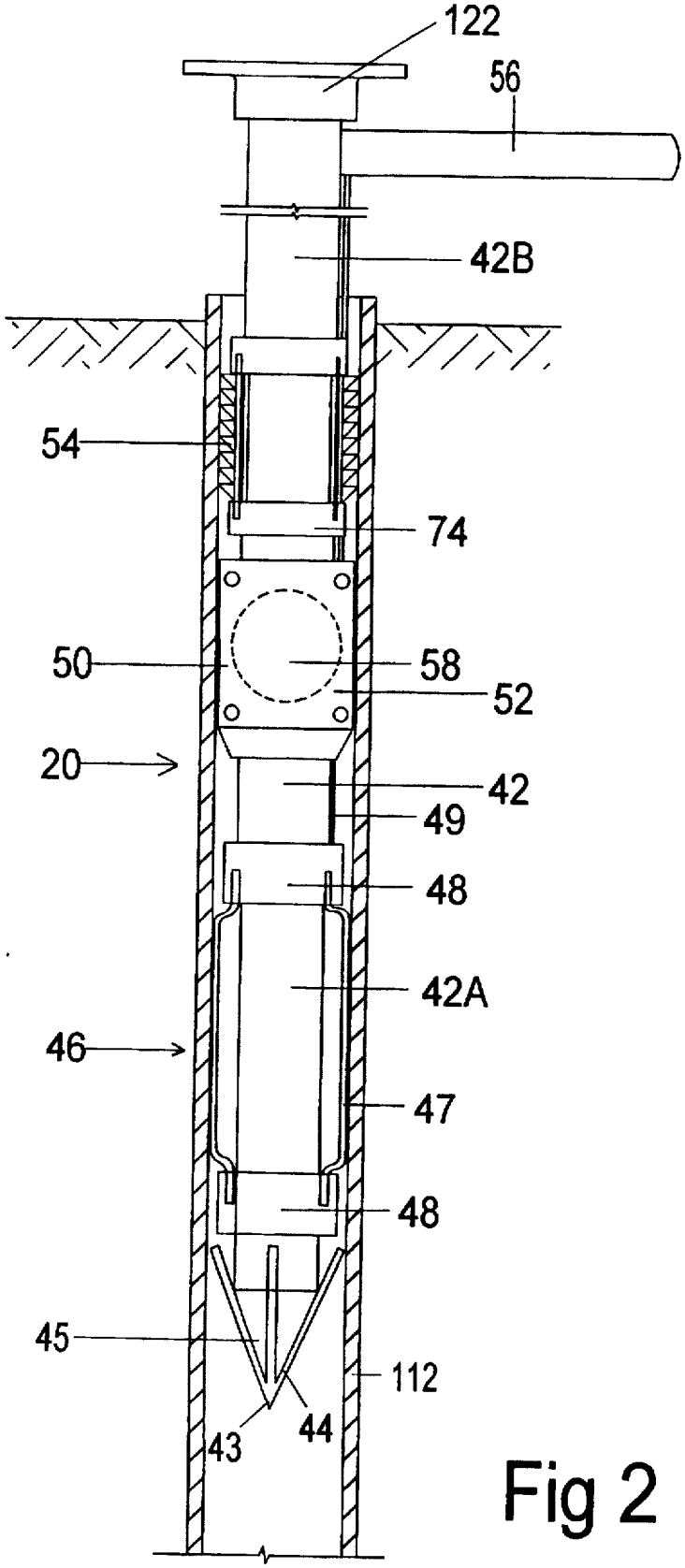
FIG. 2 is a side view, partially sectioned, of a plug body of an embodiment of the invention.

FIG. 2 shows a hot plug 20 inserted, locked, and sealed in a well casing 112. The plug 20 includes an essentially hollow cylindrical plug body 42 comprised of two sections, in particular lower plug body 42A and upper plug body 42B. Plug body 42 is formed from a heavy steel and is of a hollow tubular shape having an internal passageway therein. Plug body 42 has a guide nose or guide point 43 at a lower end thereof. Also included in the plug body is a sealing module or sealing sleeve 46 and a ball valve 50. The sealing module 46 is described in more detail with reference to FIG. 5, while the ball valve is described in more detail with reference to FIG. 3. Whether or not specifically stated hereinafter, it should be understood that portions of the plug body 42 above the ball valve assembly 50 are of the upper plug body 42B, while portions of the plug body below the ball valve assembly 50 are of the lower plug body 42A.

The guide point 43 is comprised of a plurality of guide struts 44 which meet together to define a conical structure at a lower point. Since the struts 44 are unconnected other than at the lower point, the struts 44 provide a conical volume 45. The guide point 43 serves not only to start the hot plug 20 easily into the well casing 112 upon insertion, but also centers the plug body 20 and thereby protects the sealing module 46 and ball valve 50 from catching or snagging on the top of the well casing 112. In addition, the guide point 43 allows a maximum fluid flow with minimum drag force through the open center of the hot plug body 42, thus assuring a minimum insertion force requirement.

Above the guide point 43 in FIG. 2 is the sealing module 46. The sealing module 46 (shown in more detail in FIG. 5) comprises an elastomeric, high temperature resistant, tubular sleeve or bladder 47. The sealing sleeve 47 is securely held in place on the outer peripheral surface of the plug body 42 by steel retaining collars 48 which both seal it to the hot plug body 42 and prevent relative longitudinal motion. As described hereinafter with reference to FIG. 5, the sleeve 47 is inflatable with hydraulic fluid supplied through a high pressure hydraulic fluid line 49.

Figure 3:
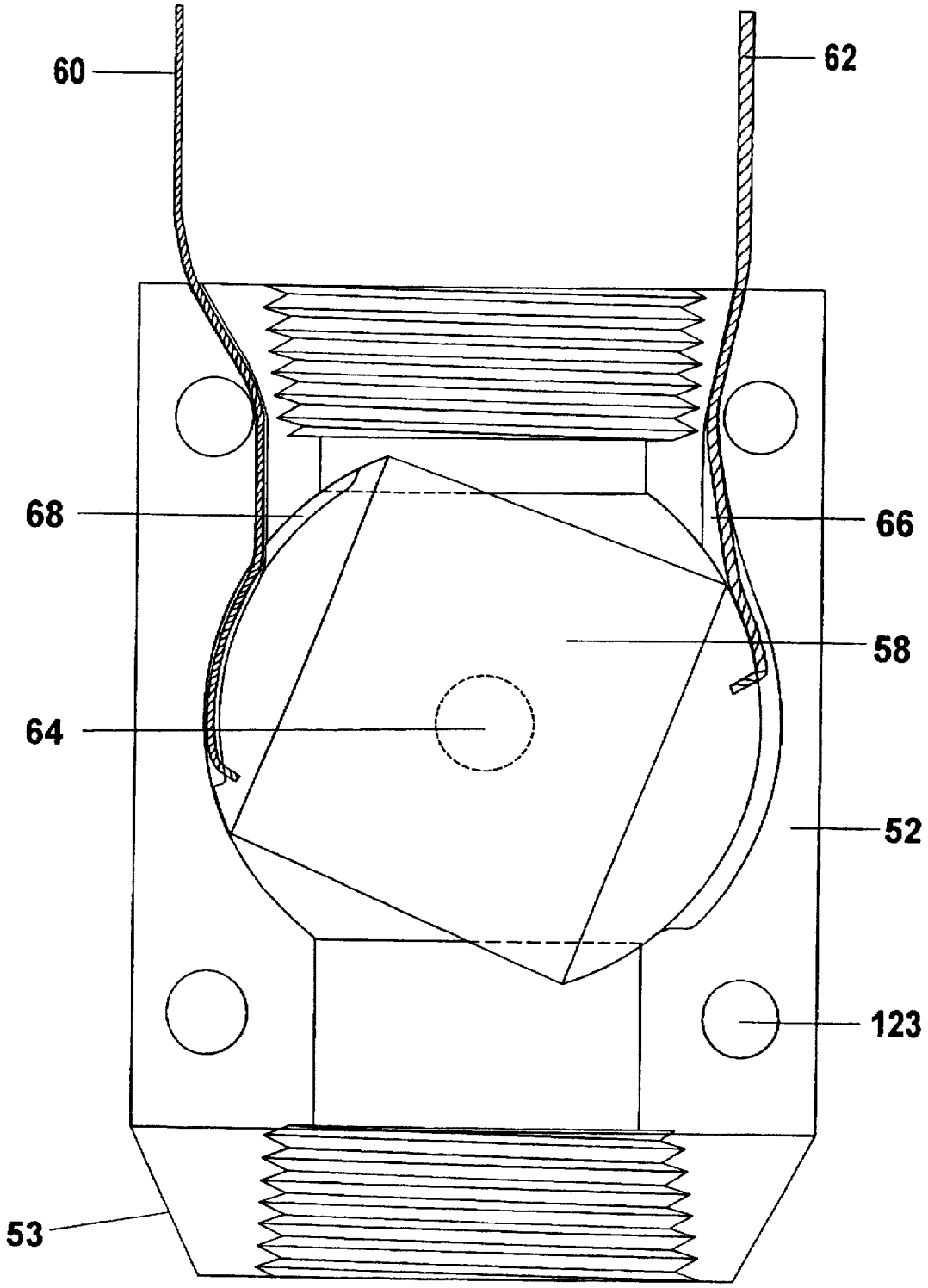
FIG. 3 is a detailed side view, partially sectioned, of a cable-operated ball valve included in a well plug of the invention.

Above the sealing module 46 in FIG. 2 is a cable operated ball valve assembly 50, illustrated in more detail in FIG. 3. A ball valve case 52 is drilled and tapped for connection of the high pressure hydraulic fluid line 49 which passes through the ball valve assembly 50 and which furnishes hydraulic fluid for inflation of the sealing module 46.

Figure 4B:
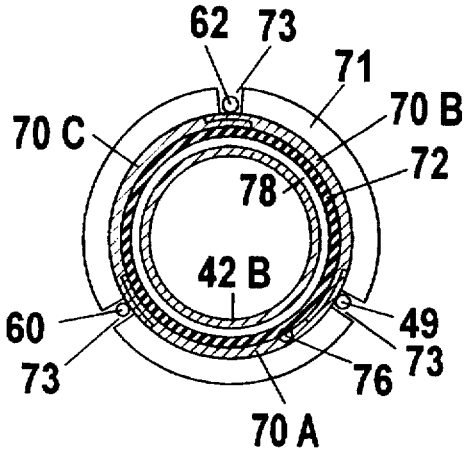
FIG. 4B is a sectioned view taken along line 4—4 of FIG. 4A.

Above the ball valve assembly 50 in FIG. 2 is a retainer module 54. In the embodiment illustrated in FIGS. 2, 4, 4B, and 4A, the retainer module 54 comprises three heavy jaw assemblies 70A, 70B, and 70C that bite into the well casing's 112 interior when the retainer module 54 is activated. As shown in FIG. 4B, the jaw assemblies 70A, 70B, and 70C are positioned around the periphery of the plug body 42, with each jaw assembly extending just shy of one third the circumference of the plug body and small gaps or spaces 73 being provided between the jaw assemblies. The jaw assemblies 70A, 70B, and 70C each have teeth 71 provided thereon and are borne by a fluid bladder 72 that inflates with hydraulic fluid when activated. Inflation of the bladder 72 causes the jaws 70 to engage the well casing 112. Two axial collars 74 hold the retainer module 54 in place on the plug body 42.

Depending on the pressure expected at a wellhead, there may be two or more retainer modules 54 used on a hot plug 20. The retainer module 54 and two alternate configurations are described in further detail with reference to FIGS. 4, 8, and 9.

Near the top of the hot plug 20, and above the portion of the hot plug 20 that is inserted into the well casing 112, is a steel radial arm or protective sleeve 56. All hydraulic lines run through the sleeve 56 between the members 144 of the insertion ram 22 and ultimately through the heat shield 30 to the vehicle 24, 26, or 28.

At the very top of the hot plug is a top flange assembly 122 which is screwed onto the hot plug body 42 with standard pipe threads. The flange assembly 122 mates with the insertion ram 22 to hold the hot plug 20 in place during insertion and allows full inside diameter fluid flow through the hot plug 20 and insertion ram 22. The flange assembly 22 can be removed for connection of the hot plug 20 to a production pipe line after the hot plug 20 is inserted, locked, sealed, and the ball valve 50 is closed. Upon connection to production piping the ball valve 50 may be easily reopened, which reopening places the well immediately into production.

FIG. 3 shows in more detail the cable operated ball valve assembly 50. The case 52 of the ball valve consists of two halves, only one half being shown by virtue of the cross section illustration of FIG. 3. The halves of the case 52 bolt together with four high strength steel bolts 123. The mating faces of the case 52 halves are precision machined to effect a seal without the use of gaskets. The lower ends of the case 52 halves having tapering surfaces 53 on their exterior to prevent them from snagging on the well casing 112 during insertion. The axial ends of the case 52 halves are internally threaded for attachment to upper and lower plug body sections 42B and 42A, respectively. One case 52 half is drilled from end to end (i.e., from top to bottom) for passage of the hydraulic fluid line 49 to the sealing module 46 for its activation. The case 52 halves may be welded together in addition to being bolted to effect greater strength and seal.

The ball valve assembly 50 includes a ball 58 of precision machined steel. The ball 58 has protruding trunions 64 on opposite sides which fit into trunion sockets in the valve case 52 halves and which allow the ball 58 to pivot smoothly about the trunion's 64 axis. Attached to the ball 58 are two steel cables 60 & 62 which serve to rotate the ball 58 to a closed position (cable 60) or open position (cable 62) when tensioned. Cable 60 has its own raceway 68 machined into the side of the ball, and cable 62 has its own raceway 66 machined into the case 52 half. A central axial opening through the ball 58 allows (when the ball is rotated to its open position) for a maximum, free flowing inside diameter for any given outside diameter. The ball 58 may or may not utilize sealing rings to effect a seal in its closed position depending on the anticipated conditions of use. A pivoted lever (not shown) near the top of the hot plug provides for one cable 60 or 62 to be slackened whenever the other cable 62 or 60 respectively is tensioned. Cable 60 is tensioned by a small hydraulic cylinder (not shown) located near the top of the hot plug 20.

Figure 4A:
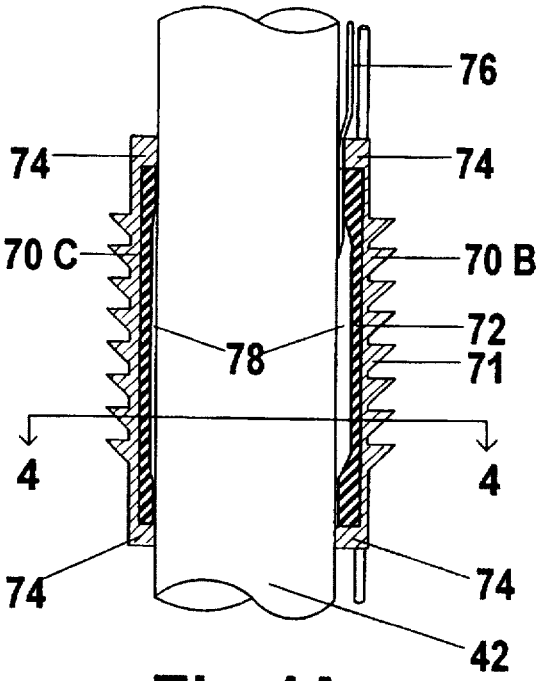
FIG. 4A is a partially sectioned side view of the retainer of FIG. 4.
Figure 4:
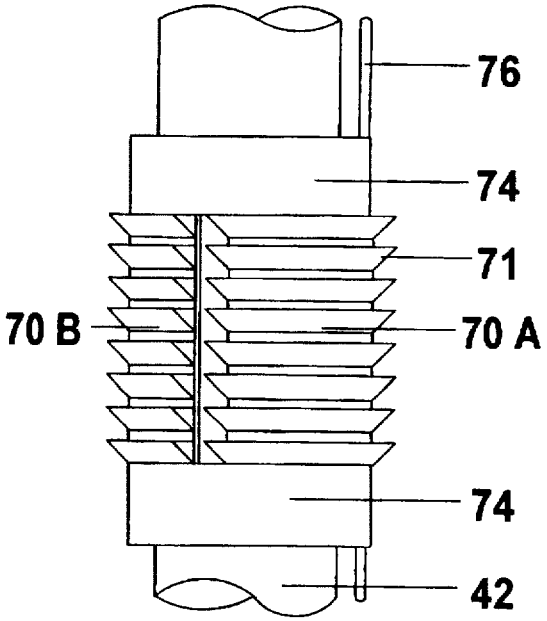
FIG. 4 is a side view of one embodiment of a retainer included in a well plug of the invention.

FIG. 4A is a lateral view, partially sectioned, of the retainer module 54 which is built around the plug body upper section 42B. As explained above, the retainer module 54 consists of three toothed jaws assemblies 70A, 70B, and 70C placed circumferentially around the hydraulic bladder 72. Both the hydraulic bladder 72 and the jaws 70 are held in place by retainer rings 74 at their upper and lower ends. The retainer rings 74 are crimped tightly in place and their outer edges are welded circumferentially to the hot plug upper body 42B. A small steel tube 76 supplies hydraulic fluid to an annular space 78 between the hot plug upper body section 42B and the hydraulic bladder 72. The application of hydraulic fluid inflates the bladder and causes the jaws 70 to be driven radially outward to firmly engage the inside surface of the well casing 112.

As shown in FIG. 4B, the spaces 73 between the jaws 70 allow the ball valve's 50 operating cables 60 and 62 to travel up past the jaws 70. The third space between the jaws 70 is utilized for placement of the hydraulic line 49 which operates the inflation of the sealing module 46. The top ends of the hydraulic fluid supply tube 76 and line 49 have check valves (not shown) installed to prevent deflation due to loss of pressure anywhere in the hydraulic system and may operate at pressures that are stepped up from the output pressure of the vehicle if necessary for locking and sealing against the extremely high pressures found in some wells.

Figure 8:
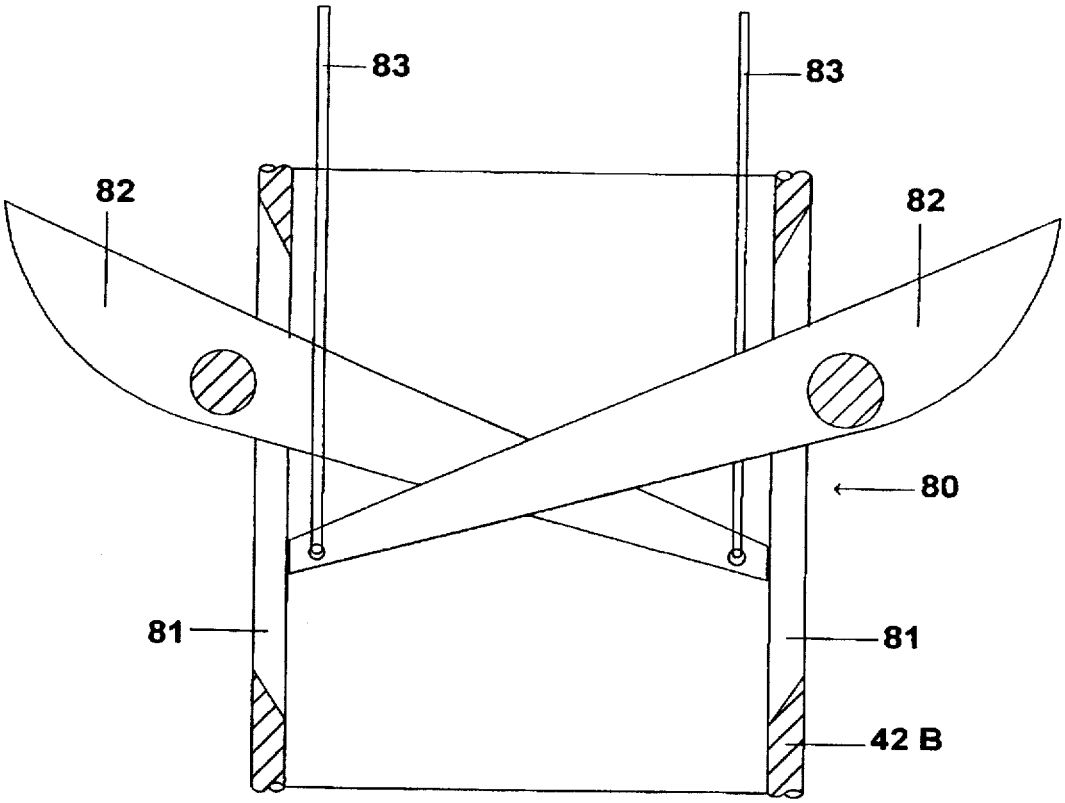
FIG. 8 is a partial longitudinal cross-section of another embodiment of a retainer usable in a well plug of the invention.

FIG. 8 is a lateral cross-section showing an alternate locking or retainer assembly 80 that employs multiple levels of pivotal engagement levers 82 in various planes and of sufficient number to assure the locking against a stated design pressure. The levers 82 extend through slots 81 provided in the plug body upper section 42B. The engagement levers 82 have cam shaped outer lower profiles that allow them to be easily inserted into the well casing 112. Their inner ends are long enough to prevent their travel past a locked position and have steel cables 83 attached that travel up the interior of the upper hot plug body 42B. The multiple cables are joined as necessary and travel over an unillustrated pulley at the top of the hot plug 20 to a small hydraulic cylinder (not shown) on the exterior of the upper hot plug body 42B that applies or releases tension to the cables 83.

Figure 9:
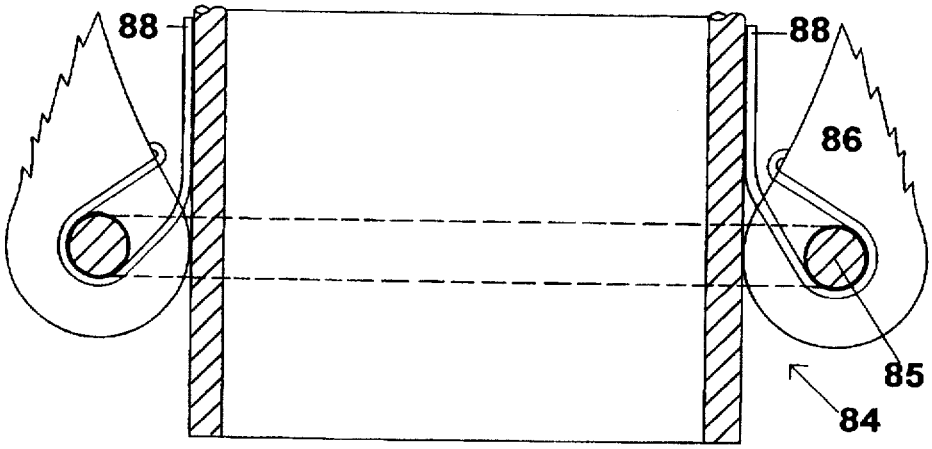
FIG. 9 is a partial longitudinal cross-section of yet another embodiment of a retainer usable in a well plug of the invention.

FIG. 9 is a lateral cross-section showing yet another alternate retainer or locking assembly 84. This assembly utilizes spring 88 operated toothed cam locks 86 spaced alternately around ring 85 between attachment brackets (not shown) which secure the ring to the upper hot plug body 42B. As few as eight cam locks 86 may be on a ring 85 and more may be provided for larger diameter hot plugs 20. A sufficient number of rings 85 are provided, as required, to resist the expected pressure of the well. Exterior cable and hydraulic lines, although not shown on FIGS. 5, 4A, 8, and 9, pass between engagement levers 82 or toothed cam locks 86 to prevent interference. Exterior cable and hydraulic lines are protected by steel tubing throughout their lengths.

Figure 5:
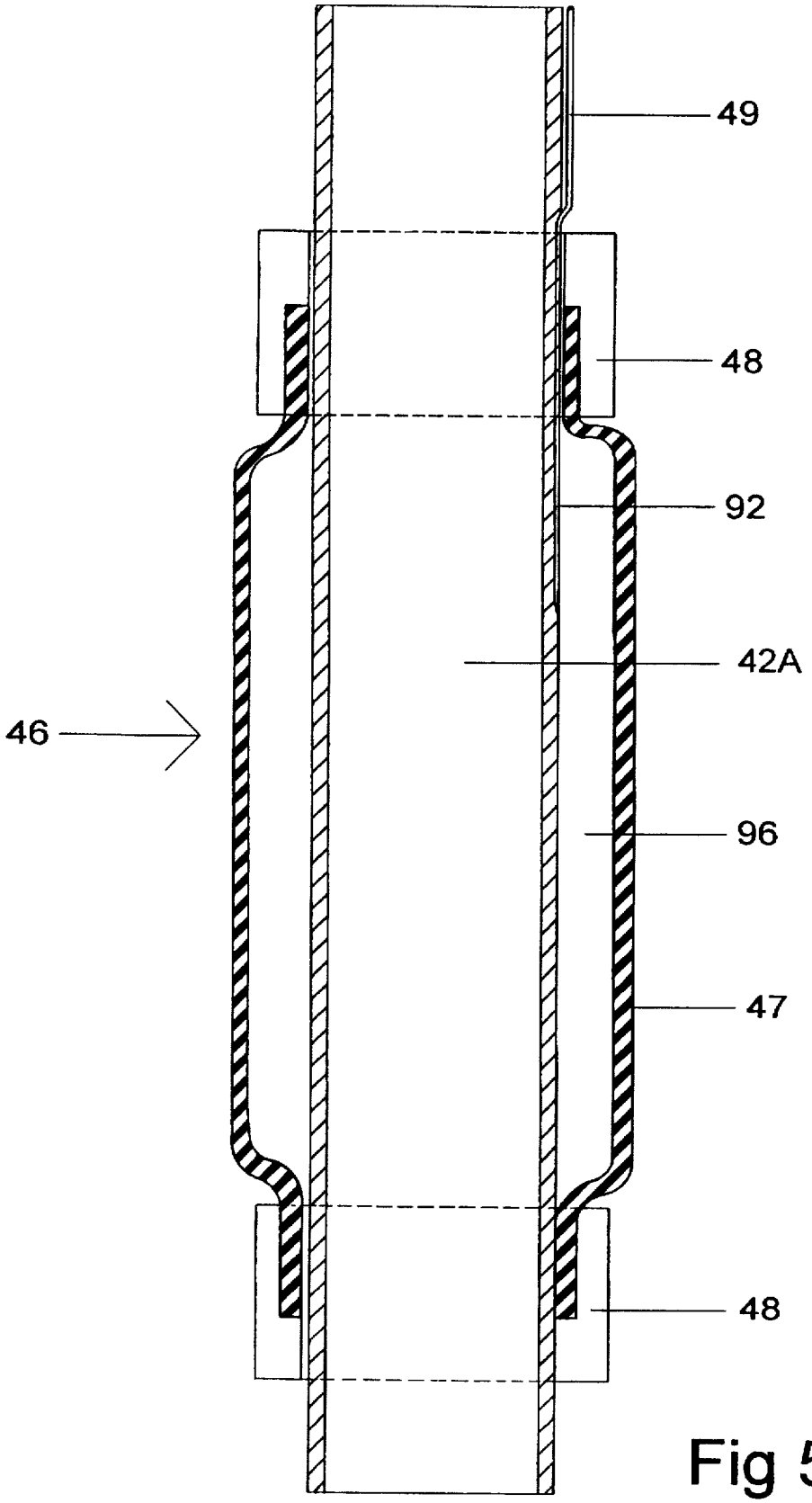
FIG. 5 is a detailed side view, partially sectioned, of a sealing sleeve usable in a well plug of the invention.

FIG. 5 is a lateral cross-section of the sealing module 46 showing the lower hot plug body 42A, the elastomeric, high temperature resistant, tubular sleeve section 47 in its inflated position, two retaining collars 48, fluid reservoir 96, and hydraulic fluid supply tube 49. The retaining collars 48 are crimped tightly in place and their outer edges may be welded to the lower hot plug body 42A to provide a secure seal and to prevent sliding along the lower hot plug body 42A under extreme loading conditions. The lower hot plug body 42A is slotted or channeled as at 92 to provide an access space for the fluid supply tube 49 which is brazed into place for a complete seal and the surface is ground smooth and/or polished so that the upper collar 48 does not crush the tube 49 and effects a secure high pressure seal. It should be understood from FIG. 5 that when hydraulic fluid passes through hydraulic fluid supply tube 49 the sleeve section 47 inflates by virtue of fluid entering the reservoir 96 until the exterior surface of the bladder 47 seals tightly against the interior of the well casing 112. The pressure of the hydraulic fluid supplied is stepped up to a pressure sufficiently greater than the fluid spewing from the uncontrolled well to generate a complete seal.

Figure 6A:
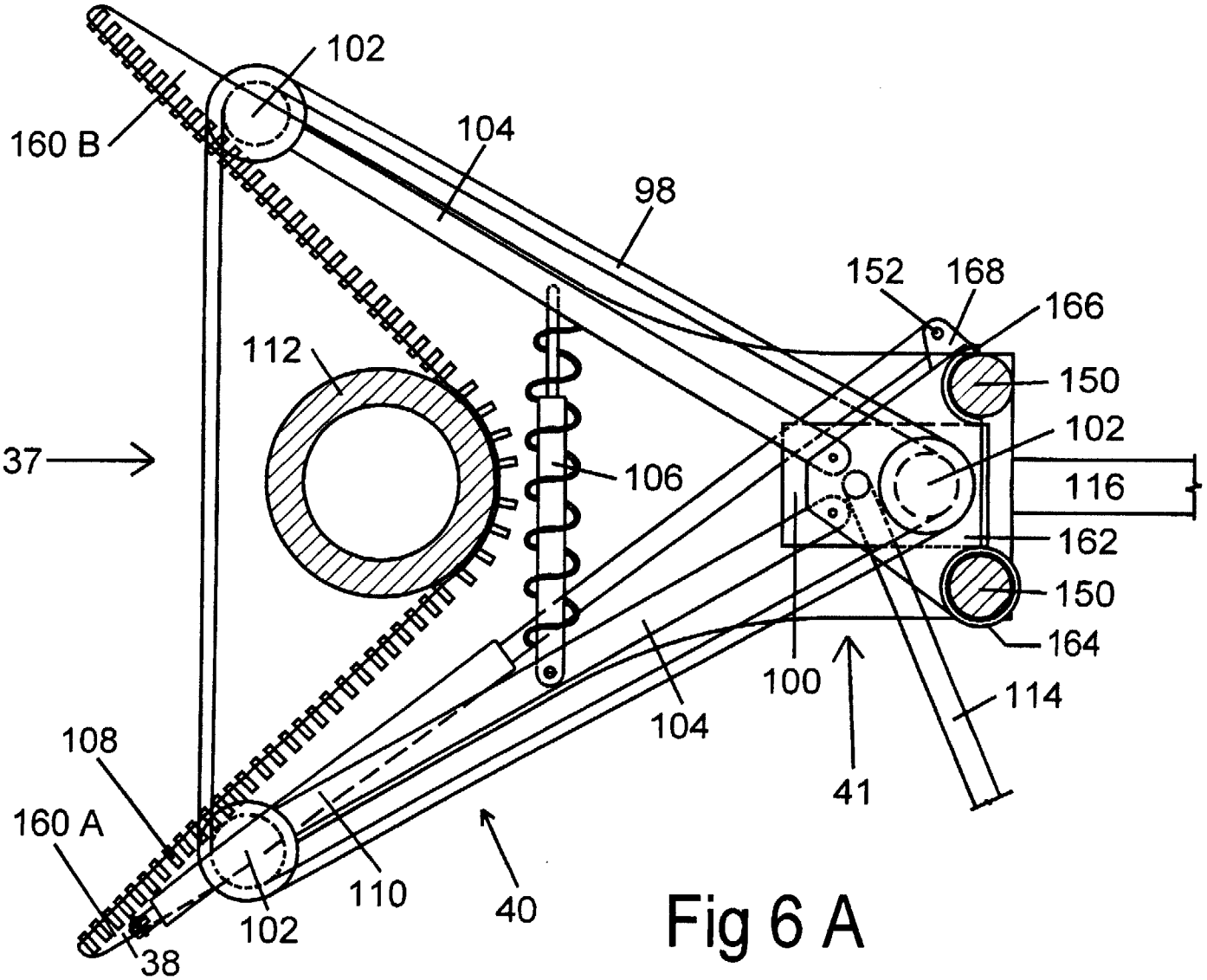
FIG. 6A is a schematic top view of an alignment assembly *including a cut-off saw* usable with a well plug of the invention, the alignment assembly being in a operative orientation.

FIG. 6A is a top view partially sectioned, showing both the alignment assembly 37 and the cutter assembly 40. FIG. 6A shows the cutter assembly 40 with power cable cut-off saw 41 in an operating position and having completed the cutting-off of a well casing 112.

The alignment assembly 37 comprises the alignment fork 38. The alignment fork 38 has two heavy vertical rods 150 that attach to the lower ends of the gantry guide rods 138. The rods 150 hold the alignment fork 38 rigidly in place. The alignment fork 38 has two fork members 160A and 160B connected to provide the fork with a V-shape. A plurality of sensors 108 are provided on facing surfaces of the two fork members 160A, 160B. As shown in FIG. 6A, the two fork members 160A, 160B are oriented to accommodate the well casing 112 therebetween.

The multiple sensors 108 indicate upon contact with well casing 112 or with a high pressure fluid flow if the well casing 112 does not extend above ground level. In one embodiment, the sensor indications are displayed on a video display device within the vehicle for observation by the vehicle operator. In an alternate embodiment, particularly the case of remote control operation, the sensor indications are displayed at a remote control console. Electrical connection lines 109 (only some of which are shown) from individual sensors 108 pass through the alignment fork 38 and join to form a cable which passes through a thermally protective conduit 116 to the vehicle 24.

The cutter assembly 40 includes a pivoting horizontal plate 162 shaped in the form of a trapezoid. At one of its back corners the cutter pivoting plate 162 carries a pivot collar 164 which rotatably surrounds a corresponding one of the vertical rods 150. At another of its back corners the cutter pivoting plate 162 carries a half-collar 166 which bears against a corresponding other one of the vertical rods 150 when the cutter assembly 40 is in its utilization configuration. The half-collar 166 has a radial connection flange 168 which has a pin hole therein for receiving a connection pin 152. Further, the plate 162 has a first of three pulley wheels 102 rotatably mounted thereon.

The cutter plate 162 has two horizontal support struts 104 which extend therefrom in a V-Shaped cantilevered fashion. Intermediate segments of the struts 104 are connected by a cross-bar and spring tensioning assembly 106 to provide sufficient force for maintaining separation of the struts 104. On their distal ends, the support struts 104 each have one of the other two of the three pulley wheels 102 rotatably mounted thereon. The pulley wheels 102 are mounted in a horizontal plane so that a multistrand abrasive cable 98 (comprising saw 41) can be entrained thereabout.

The cutter assembly 40 slides vertically downward onto the left vertical rod 150. A first hydraulic cylinder 110 is anchored to the fork member 160A and has its piston attached to the connection flange 168 by the pin connection 152. The hydraulic cylinder 110 extends until stopped by contact with the right vertical rod 150 of the alignment fork 38, thereby moving the power cable cut-off saw 41 into its operating position and maintaining the saw 41 in that utilization position. When the hydraulic cylinder 110 retracts, it moves the power cable cut-off saw 41 into its swing-away, or stored, position.

The abrasive cable 98 travels on the three silicone rubber lined pulley wheels 102, two of which are held in place by pulley support struts 104 and spring tensioner 106. The third pulley 102, which is the drive pulley, is attached to and driven by a hydraulic motor 100. The hydraulic motor 100 is served by hydraulic fluid supply and return lines that travel to the power cable cut-off saw 41 from the vehicle (24, 26, 28) in a thermally protected flexible conduit 114.

Figure 6B:
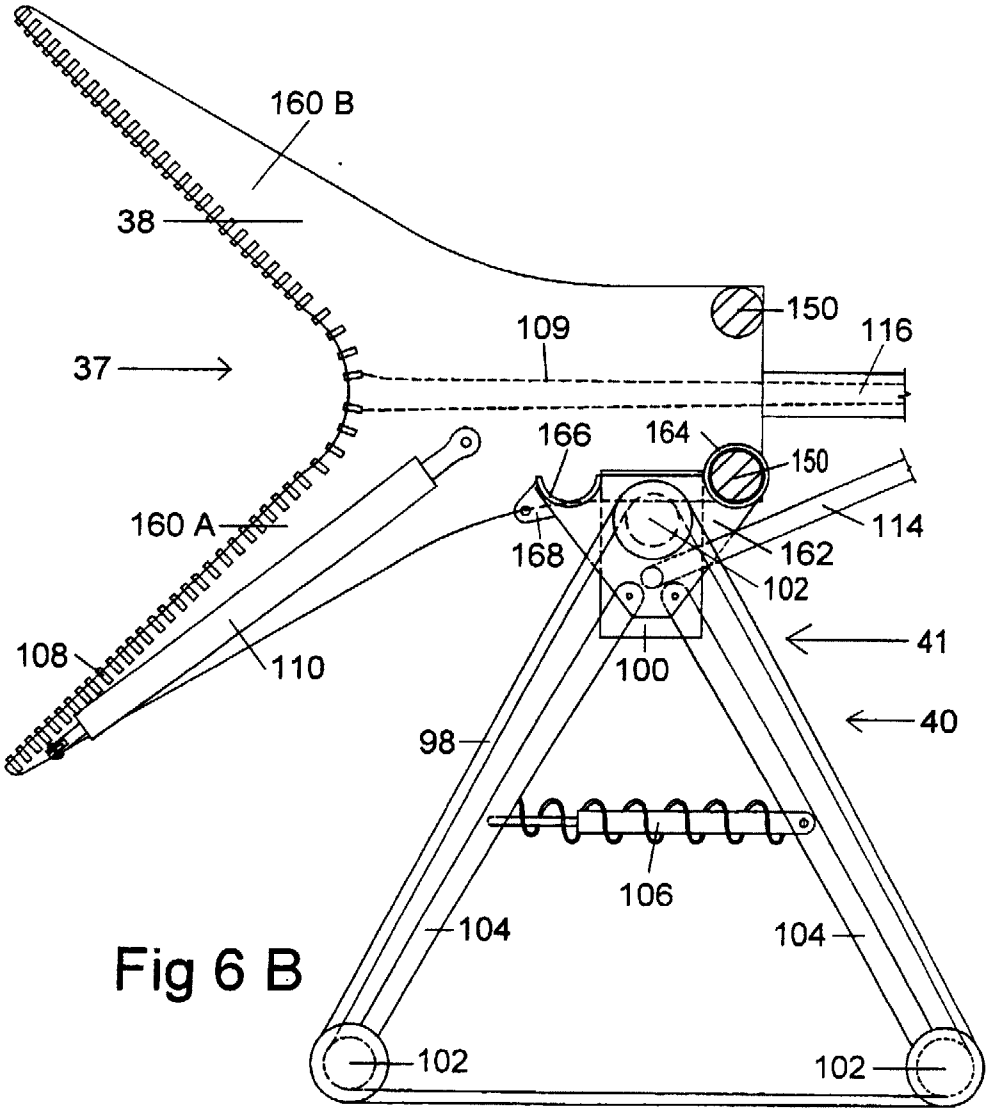
FIG. 6B is a schematic top view of the alignment assembly of FIG. 6A *with the cut-off saw* in a storage orientation.

FIG. 6B is a schematic top view of the alignment fork 38 with the power cable cut-off saw 41 attached and shown in its swing-away or stored position (with the swing-away operating cylinder 110 shown disconnected for illustration purposes only). Also shown are the hydraulic supply, return, and control lines 114 which have thermal protection and carry hydraulic fluid from the vehicle to the hydraulic motor and return, as well as the thermally protected sensor lines 116 which carry sensor indications to a video screen mounted within the vehicle or, alternatively, are sent by a computer on board the vehicle to a remote control console.

Figure 7A:
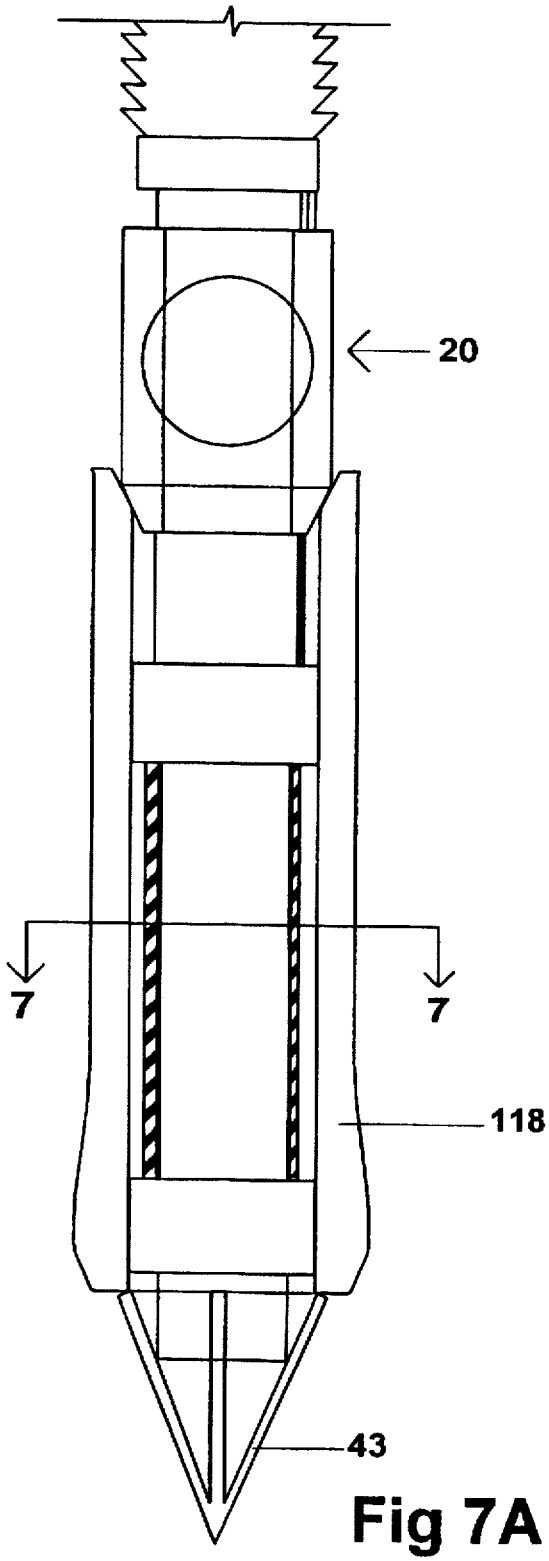
FIG. 7A is a side view, partially sectioned, of a plug body of a second embodiment of the invention

FIG. 7A is a lateral view, partially sectioned, of the lower part of a hot plug assembly 20 showing a protective break-away shell 118 installed for additional thermal protection. The shell 118 may be of potter's clay, ceramic, or other heat resistant material. The break-away shell is installed before the guide point 43 is welded in place and extends radially beyond the guide point 43 so that contact with the top of the well casing 112 will cause it to break easily and have its pieces carried away by the stream of well fluid during the insertion process.

Figure 7B:
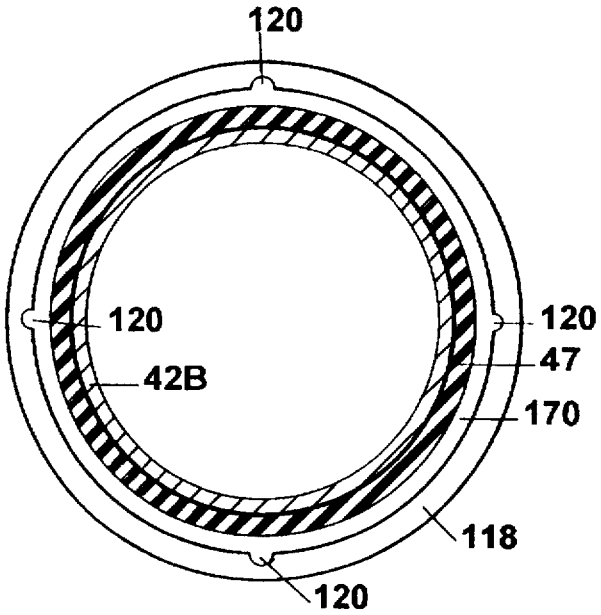
FIG. 7B is a cross-sectional view of the plug body of FIG. 7A taken along line 7—7.

FIG. 7B is a cross-sectional view of the hot plug taken through the middle of the sealing module 46 with a protective break-away shell 118 installed. There is an air space 170 between the sealing sleeve 47 and the protective break-away shell 118. Formed-in fault lines 120 which assist in breaking are shown in FIG. 7B. Also shown is the lower hot plug body 42A.

Figure 10:
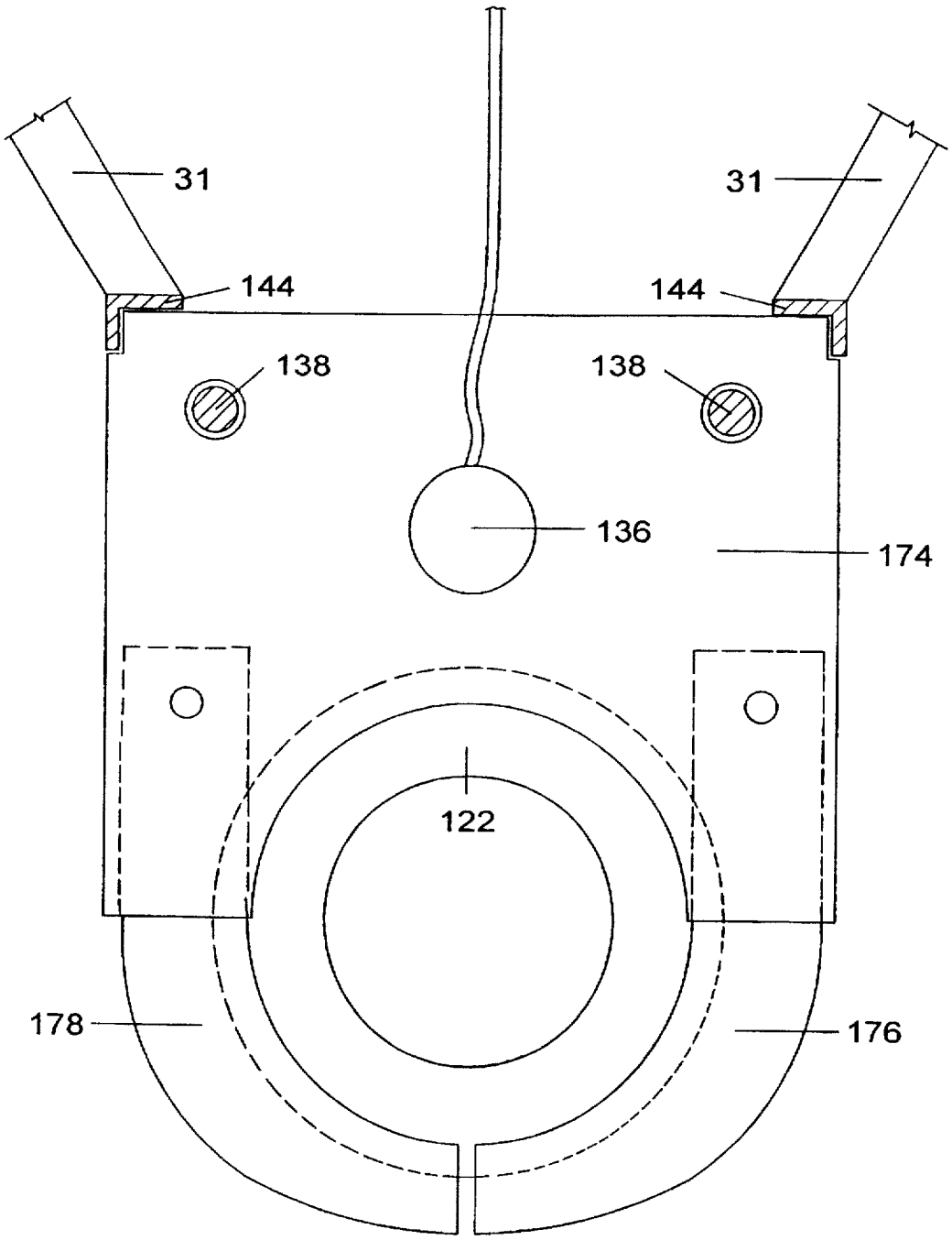
FIG. 10 is a sectional view of the apparatus of FIG. 1A taken along line 10—10.

FIG. 10 is a horiztonal cross section of the gantry 21 looking downwardly from above. FIG. 10 shows movable plate 174, which travels up and down, being guided by guide rods 138 and vertical frame members 144 and driven by the double acting hydraulic cylinder 136. Plate 174 engages flange 122 at the top of the hot plug 20, which is held securely by holding plates 176 and 178 when they are pivoted to their closed positions as shown in FIG. 10.

OPERATION

The well plugging operation begins with collection of data. Data are collected on the inside diameter of the well casing, site conditions, pressure encountered in this particular field (or, if not available, in the general area), availability of safety and support services, and a variety of other information. From the data an operational plan is developed and implemented. A hot plug 20 of the correct size range for the well casing is loaded onto the gantry assembly 21. The saw 41 is installed, if needed. The vehicle and all equipment are assembled at the site, checked and tested, fueled, and made ready.

If obstructions are present, or the casing 112 extends to a troublesome height, the power cable cut-off saw 41 is pivoted to its utilization configuration by activation of the cylinder 110.

The vehicle with heat shield 30, gantry assembly 21, hot plug 20 and alignment assembly 37 in place is moved up the well head. The vehicle moves straight ahead so that the alignment assembly 37 contacts the well casing 112. Maneuvering of the vehicle is aided by the sensor display which receives inputs from the sensors 108. The sensory input enables the operator to align perfectly the alignment assembly 37, and hence the entire gantry assembly 21 and the plug 20, over the well casing 112 or center of fluid flow.

When alignment is reached (in less than one minute), the motor 100 is activated to power the cable saw 41. The vehicle is driven to push the saw 41 into the casing 112 (e.g., to the left in FIG. 1) until the saw 41 has eaten completely through the casing 112.

Upon completion of the casing 112 cut-off operation, the hydraulic cylinder 136 of the gantry assembly 21 is activated to push the hot plug 20 into the well casing 112. The hot plug 20 is then locked into the well casing by activating its locking or retaining module 54. Then, hydraulic fluid is supplied to the bladder 47 of the sealing module 46 for sealing the plug 20 against the interior surface of the well casing 112. The ball valve assembly 50 is then closed very slowly in order to minimize the hammer effect.

After installation, the hot plug 20 can then either be left in place as a temporary cap: be removed and replaced by a "Christmas Tree" type of control valve; or be epoxy grouted or welded permanently in place and connected to production piping (after removing the flange assembly 122). When permanently secured and connected, the ball valve assembly 50 may be re-opened to place the well rapidly into production.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. An apparatus for plugging a burning or gushing well, the apparatus comprising:

a tubular plug body for sealing insertion and retention in a well casing, the plug body having a selectively closable hollow internal passageway;

a gantry assembly upon which the plug body is suspended above the well casing;

a sensor assembly provided at a lower end of the gantry assembly for sensing proximity to the well casing.

2. The apparatus of claim 1, wherein the sensor assembly comprises:

a fork which horizontally extends from the gantry assembly;

a plurality of sensors located on the fork in predetermined positions.

3. The apparatus of claim 2, wherein the fork has two fork members connected to provide the fork with a V-shape, and wherein the plurality of sensors are provided on facing surfaces of the two fork members, the two fork members being oriented to accommodate the well casing therebetween.

4. A method for plugging a burning or gushing well, the method comprising:

sensing with a sensor assembly a relative positioning between a well casing and a plug body to be inserted in the well casing, and providing a positioning signal from said sensor assembly in accordance with the sensed relative positioning;

inserting a tubular plug body into the well casing when the positioning signal indicates a proper relative positioning.

5. The method of claim 4, further comprising:

locking the plug body into the well casing by actuating a retainer;

forming a seal between the peripheral surface of the plug body and the well casing;

selectively closing the hollow internal passageway of the tubular plug body.

*6. A ball valve assembly comprising:*

*a valve case having an interior space which communicates with first and second axial ports of the valve case;*

*a ball rotatably positioned within the valve case, the ball having an axial central opening therein;*

*a first cable having a first end attached within the interior space of the valve case to the ball to rotate selectively the ball to one of a first position and a second position, the first position having the axial central opening of the ball aligned with the axial ports of the valve case and the second position not having the axial central opening of the ball aligned with the axial ports of the valve case, a second end of the first cable being remotely positioned with respect to the valve case.*

*7. The apparatus of claim 6, further comprising a second cable having a second cable first end attached within the interior space of the valve case to the ball and a second cable second end being remotely positioned with respect to the valve case for selectively rotating the ball from the second position to the first position.*

*8. The apparatus of claim 7, wherein within the interior space of the valve case the ball has a raceway provided therein for at least one of the first cable and the second cable.*

*9. The apparatus of claim 7, wherein the valve case has a raceway internally provided therein for at least one of the first cable and the second cable.*

*10. The apparatus of claim 6, wherein within the interior space of the valve case the ball has a raceway provided therein for the cable.*

*11. The apparatus of claim 6, wherein the valve case has a raceway internally provided therein for the cable.*

* * * * *